US012211376B2

(12) United States Patent
Yilma et al.

(10) Patent No.: US 12,211,376 B2
(45) Date of Patent: Jan. 28, 2025

(54) METHOD AND SYSTEM OF WARNING ROAD VEHICLES OF AN APPROACHING EMERGENCY VEHICLE

(71) Applicant: NEC Laboratories Europe GmbH, Heidelberg (DE)

(72) Inventors: Girma Mamuye Yilma, Heidelberg (DE); Faqir Zarrar Yousaf, Heidelberg (DE)

(73) Assignee: NEC Laboratories Europe GmbH, Heidelberg (DE)

(*) Notice: Subject to any disclaimer, the term of this patent is extended or adjusted under 35 U.S.C. 154(b) by 221 days.

(21) Appl. No.: 17/920,414

(22) PCT Filed: Apr. 27, 2020

(86) PCT No.: PCT/EP2020/061652

§ 371 (c)(1),
(2) Date: Oct. 21, 2022

(87) PCT Pub. No.: WO2021/219196

PCT Pub. Date: Nov. 4, 2021

(65) Prior Publication Data

US 2023/0143613 A1 May 11, 2023

(51) Int. Cl.

| | |
|---|---|
| ***G08G 1/01*** | (2006.01) |
| ***G08G 1/0965*** | (2006.01) |
| ***G08G 1/0967*** | (2006.01) |

(52) U.S. Cl.

CPC ......... *G08G 1/0141* (2013.01); *G08G 1/0129* (2013.01); *G08G 1/0145* (2013.01); *G08G 1/0965* (2013.01); *G08G 1/096791* (2013.01)

(58) Field of Classification Search

CPC .. G08G 1/0141; G08G 1/0129; G08G 1/0145; G08G 1/0965; G08G 1/096791;

(Continued)

(56) References Cited

U.S. PATENT DOCUMENTS

| | | | |
|---|---|---|---|
| 8,941,489 | B2 | 1/2015 | Sheshadri et al. |
| 10,373,498 | B2 | 8/2019 | Tanabe |

(Continued)

FOREIGN PATENT DOCUMENTS

| | | | |
|---|---|---|---|
| JP | 2017/162359 | A | 9/2017 |
| JP | 2017/195556 | A | 10/2017 |
| WO | WO 2019/079845 | A1 | 5/2019 |

OTHER PUBLICATIONS

English translated Written Opinion for JP 2023523330, dated Apr. 22, 2024. (Year: 2024).*

(Continued)

*Primary Examiner* — Calvin Cheung

(74) *Attorney, Agent, or Firm* — Leydig, Voit & Mayer, Ltd.

(57) ABSTRACT

A method of warning target objects (TOs) of an approaching reference object (RO) includes receiving, by a back-situation awareness function (BSAF) application, RO notification (RON) messages from the RO containing RO related state information, generating, by the BSAF application, a geo-sector (GS) area including a number of GS segments between a current location of the RO and a destination object (DO) specifying a destination location of the RO, calculating, by the BSAF application, for each of the GS segments of the GS area an expected time of arrival (ETA) of the RO at a respective one of the GS segments, and disseminating the calculated GS segment specific ETA values to the TOs.

20 Claims, 10 Drawing Sheets

(58) Field of Classification Search
CPC ....... G08G 1/096708; G08G 1/096775; G08G 1/0112
See application file for complete search history.

(56) References Cited

U.S. PATENT DOCUMENTS

| | | | | |
|---|---|---|---|---|
| 2004/0246144 | A1* | 12/2004 | Siegel .................. | G08G 1/0965 340/902 |
| 2014/0227991 | A1 | 8/2014 | Breton et al. | |
| 2016/0232790 | A1 | 8/2016 | Massey et al. | |
| 2017/0098373 | A1 | 4/2017 | Filley et al. | |
| 2018/0204447 | A1 | 7/2018 | Morgan et al. | |

OTHER PUBLICATIONS

English translated Notice of Reasons for Refusal for JP 2023523330, dated Jan. 22, 2024. (Year: 2024).*
JP 2017203696 A with English translation, date published Nov. 16, 2017. (Year: 2017).*
JP 2017162359 A with English translation, date published Sep. 14, 2017, date filed Mar. 11, 2016. (Year: 2017).*
WO 2019109645 A1 with English translation, date filed Jul. 27, 2018, date published Jun. 13, 2019. (Year: 2019).*

* cited by examiner

| Key 1 | Key 2 | Value |
|---|---|---|
| RO Direction | GS Id | • GS type [enum]<br>• $ETA_i$<br>• Notifications [enum] |

METHOD AND SYSTEM OF WARNING ROAD VEHICLES OF AN APPROACHING EMERGENCY VEHICLE

CROSS REFERENCE TO RELATED APPLICATIONS

This application is a U.S. National Phase application under 35 U.S.C. § 371 of International Application No. PCT/EP2020/061652, filed on Apr. 27, 2020. The International Application was published in English on Nov. 4, 2021, as WO 2021/219196 A1 under PCT Article 21(2).

FIELD

The present invention relates to a method and a system of warning target objects, TOs, in particular road vehicles, of an approaching reference object, RO, in particular an emergency vehicle.

BACKGROUND

In the event of emergencies, emergency responder vehicles (e.g., ambulances, fire engines, police cars, etc.) are often hindered by the traffic that they encounter while on the way to the event spot. The vehicles on the road only become aware of the presence of an emergency responder when they are in the audible and visual range of the drivers, as the existing emergency vehicles (EmV) are equipped with flashing lights and a loud siren to pre-warn the traffic at the front. However, this may not give the drivers enough time to collaboratively and effectively manoeuvre to create a clear corridor for the EmVs to pass through, especially in case of heavy traffic situation, where the room for manoeuvre is limited, and/or the driver(s) is(are) unable to hear the sirens, either due to loud music or hearing impairment. To the contrary, this can lead to panic amongst the vehicles' drivers leading to further congestion and even accidents, because of and with the EmVs. Such situations can cause unpredictable delays resulting in the loss of precious time greatly compromising the effectiveness of the emergency responders in dealing with emergencies.

There are already solutions that address the above issue by relying on a direct vehicle-to-vehicle (V2V) communication, for example using PC5 links, for the approaching vehicle to inform the vehicles at the front of its arrival/presence. However, this solution is not suitable for emergency situations due to the limited range of direct V2V communication, which is in the range of few hundred meters, thus not giving enough warning time to the vehicles of the approaching high speed EmVs. Moreover, this solution will result in inaccurate dissemination of the EmVs Estimated Time of Arrival (ETA), even to vehicles that may not be on the route of the EmV. This method also has security vulnerabilities, which makes it unsuitable for deployment in emergency situations.

SUMMARY

In an embodiment, the present disclosure provides a method of warning target objects (TOs) of an approaching reference object (RO), the method comprising receiving, by a back-situation awareness function (BSAF) application, RO notification (RON) messages from the RO containing RO related state information, generating, by the BSAF application, a geo-sector (GS) area including a number of GS segments between a current location of the RO and a destination object (DO) specifying a destination location of the RO, calculating, by the BSAF application, for each of the GS segments of the GS area an expected time of arrival (ETA) of the RO at a respective one of the GS segments, and disseminating the calculated GS segment specific ETA values to the TOs.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
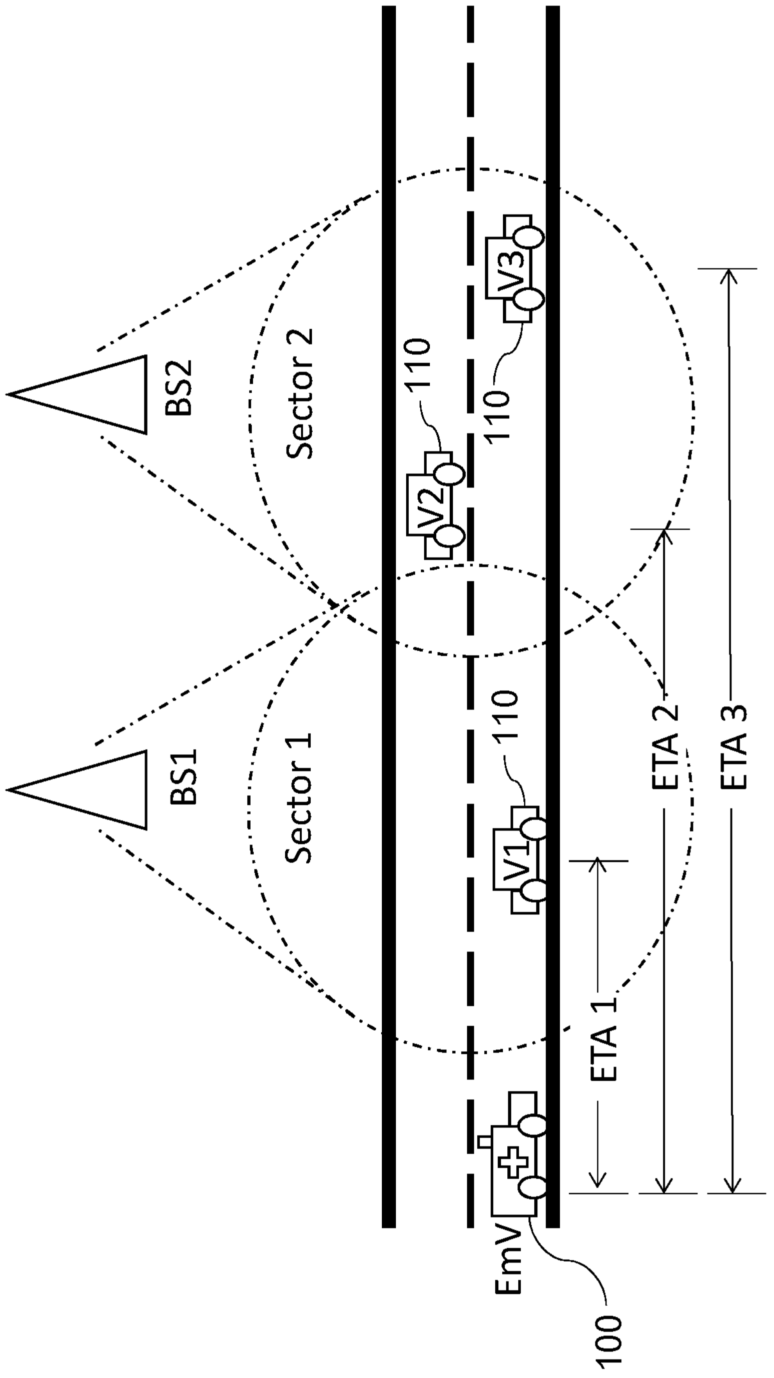
FIG. 1 is a schematic diagram illustrating the general concept of determining RO's ETA values with respect to preceding TOs in accordance with embodiments of the invention.

The project leading to this application has received funding from the European Union's Horizon 2020 research and innovation programme under grant agreement No 825012.

Embodiments of the present invention improve and further develop a method and a system of warning TOs, in particular road vehicles, of an approaching RO, in particular an emergency vehicle, in such a way that TOs are warned at a specific point in time well in advance of the actual arrival of an RO at their location in a reliable way.

In accordance with embodiments of the invention, a method is provided of warning target objects, TOs, in particular road vehicles, of an approaching reference object, RO, in particular an emergency vehicle, the method comprising:

receiving, by a back-situation awareness function, BSAF, application, RO notification, RON, messages from the RO containing RO related state information, generating, by the BSAF application, a geo-sector, GS, area including a number of GS segments between a current location of the RO and a destination object, DO, specifying a destination location of the RO, calculating, by the BSAF application, for each of the GS segments of the GS area an expected time of arrival, ETA, of the RO at the respective one of the GS segments, and disseminating the calculated GS segment specific ETA values to the TOs.

Furthermore, embodiments of the present invention provide a system of warning target objects, TOs, in particular road vehicles, of an approaching reference object, RO, in particular an emergency vehicle, the system comprising a back-situation awareness function, BSAF, application that is configured to receive RO notification, RON, messages from the RO containing RO related state information, to generate a geo-sector, GS, area including a number of GS segments between a current location of the RO and a destination object, DO, specifying a destination location of the RO, to calculate for each of the GS segments of the GS area an expected time of arrival, ETA, of the RO at the respective one of the GS segments, and to provide for the dissemination of the calculated GS segment specific ETA values to the TOs.

According to embodiments of the invention, a beyond-visual-audible-range (BVAR) method/system is provided for accurate determination of an Expected Time of Arrival (ETA) of emergency vehicles to select vehicles on the route path of the emergency vehicle well in advance and to give the vehicles enough time to collaboratively create a clear corridor for the emergency vehicle. An important aspect according to embodiments of the invention is a dynamic creation and management of a contiguous chain of geo-sectors, GS, along the route path of the emergency vehicle. The chain of GS segments can be regarded as a geo-sector, GS, chain. According to embodiments of the invention, the size, shape and configuration of each geo-sector is dynamically adjusted in response to changing traffic/road situations. An ETA is calculated for each respective geo-sector, GS, and broadcasted by the infrastructure to provide early warning to the BVAR vehicles.

Embodiments of the invention relate to a method for on-demand elastic configuration, management, and sliding of chained geo-sectors, GS, for accurate estimated time of arrival, ETA, information derivation and dissemination per geo-sector, GS. Since the creation of the GS chain is event driven, it will save on computational resources.

According to embodiments of the invention, the GS area may be configured in form of a GS chain including a number of contiguously linked GS segments between the current location of the RO and the destination object, DO.

According to embodiments of the invention, the calculated GS segment specific ETA values may be disseminated via a mobile network infrastructure in all GS segments of the GS chain to be received by the TOs.

According to embodiments of the invention, the calculation, by the BSAF application, may not only include the ETA value for the respective GS segments, but may also include other relevant notifications (e.g., adequate warning notification messages), which may be disseminated together with the ETA values.

Further embodiments of the invention relate to mechanisms of how the ETA values are notified to the selected/relevant vehicles. Systems/methods according to embodiments of the invention leverage on a pervasive communication infrastructure in general and edge network infrastructure in particular, coupled with a geo-sectoring technique. The present state of art relies on static geo-fences, whose coverage may expand/shrink at best, but embodiments of the present invention provide a mechanism where a contiguous chain of geo-sectors are deployed on-demand, where the size of geo-sectors in the chain are non-linear and determined by external factors (such as time of day, traffic situation, road conditions, etc.). The geo-sector segments in the chain may not only expand and contract with respect to each other, but they may also slide with time.

There are several ways how to design and further develop the teaching of embodiments of the present invention in an advantageous way. To this end, it is to be referred to the following explanation of preferred embodiments of the invention by way of example, illustrated by the figures on the other hand. In connection with the explanation of the preferred embodiments of the invention by the aid of the figures, generally preferred embodiments and further developments of the teaching will be explained. In the drawing In the context of the present disclosure, the following terminology will be used:

A Reference Object (RO) denotes an object with reference to which current position and destination a geo-sector area, e.g. in form of a geo-sector-chain (GSC), is deployed and managed. According to embodiments of the invention, the RO may be an EMV.

A Target Object (TO) denotes an object that receives information about the RO such as its location, speed, estimated time of arrival (ETA), etc. According to embodiments of the invention, a TO may be any vehicle preceding an EmV that is supposed to receive (or provided) the EmV's ETA information. In the present disclosure, the term TO and vehicle will be used interchangeably, unless indicated otherwise.

A Destination Object (DO) denotes a destination that the RO is supposed to reach. The destination object may either be a static object, which can be, e.g., an event location, or it may be a mobile object, such as another vehicle that the RO is trying to catch up with. In case the DO is static, it will be referred to as a Static DO (SDO) and in case the DO is mobile it will be referred to as a Mobile DO (MDO). For the sake of simplicity and clarity, the SDO and MDO are referred to simply as a DO, unless specified and mentioned otherwise.

According to embodiments, the present invention relates to beyond-visual-audible-range (BVAR) systems/methods that provide a secure and accurate notification and dissemination of the approaching EmVs' ETA well in advance to warn the proceeding vehicles on the route of the EmVs and to allow the drivers enough time to take appropriate collaborative and safe actions to create a clear corridor for the EmVs to pass through unhindered.

According to embodiments of the present invention, a compute function/application, which is referred to as back-situation awareness function (BSAF) application, is configured to derive accurate ETA and/or other information (such as manoeuver recommendation) relevant to a RO, wherein this information is then disseminated to the TOs that are on the same route path to notify them of the RO's ETA towards them, possibly together with other information. To this effect, the following main challenges require consideration.

1. The value of ETA is most likely to change and not remain constant. This is because of unexpected traffic situations on the route. For example, an ETA value that was calculated earlier may no longer be relevant in case the RO encounters an unforeseen/unexpected congested section on the route. In such a situation, the ETA value has to be revised, and re-notified to keep the TOs updated.

2. The value of ETA is different for different preceding TOs depending on their distance from the RO. That is, the ETA value will be smaller for preceding TOs that are nearer to the RO as compared to those vehicles, which are farther away from the RO. This can be obtained from the scenario illustrated in FIG. 1, where ETA1<ETA2<ETA3 due to the distance of the EmV (i.e., RO 100) from Vehicle 1 (V1), Vehicle 2 (V2) and Vehicle 3 (V3) (i.e., TOs 110).

3. The system/method complexity will increase if it is required to calculate and then notify the ETA for each respective preceding TO on the route path. This implies that the system has to keep track of each individual TO on the route path and send separate (unicast) notifications. Specifically, the system complexity will increase

- a. as the number of TOs (e.g., vehicles) on the route path increases;
- b. if the frequency of TOs entering/departing the route path is high; and/or
- c. if there is greater variability in the speed/velocity of the preceding TOs.

4. Not all TOs on the route path are required to receive the ETA information. This is true for vehicles that are in an opposite lane of a two-way highway with a physical lane-barrier separating the two roads. If the system/method is not able to discern between the TOs that are relevant to receive the ETA notification messages then even non-relevant TOs receiving the ETA notification message will create unnecessary slowing of traffic in non-affected lanes thereby causing further slowing down of traffic and/or congestion. An example of non-relevant TOs are vehicles that are moving away from the DO in the direction towards the RO but on the opposite side of the road that is divided by a hard barrier, and which the RO cannot use.

Considering the above challenges, embodiments of the present invention provide a BSAF application component that is continuously, for instance periodically, notified about the state of the respective RO. That is, the RO may be configured to periodically send notification messages, referred to as RO notification (RON) messages, towards the BSAF entity. The periodicity of the RON messages can either be configured as a constant value or it may dynamically adjust, in particular with reference to the speed of the RO. That is, the higher the speed of the RO, the higher the transmission frequency of the RON messages.

According to embodiments of the invention, the RON messages encode the state information related to the RO. Table 1 provides an exemplary non-exhaustive list of the state information that may be encoded in the RON message.

TABLE 1

RO RELATED STATE INFORMATION MODEL FOR THE RON MESSAGE.

| Data | Type | Description |
|---|---|---|
| RO Id | Unsigned Integer | An identifier unique to the RO (e.g., EmV) |
| Type (optional) | Enum | Type of RO i.e., ambulance, fire engine, police vehicle, etc. |
| Average Speed | Integer | Average speed of RO over a specified distance |
| Current Speed | Integer | Current speed of RO |
| Direction | Enum | Direction of RO |
| Location | GPS coordinates | Current location of RO |
| Destination | GPS coordinates | End destination of RO |
| Route path | Navigation System output | The route path determined by the navigation system that the RO follows to reach the destination |
| Time stamp | Time | The time at which the RON message is transmitted |

According to an embodiment, the RON message may be composed by an on-board unit (OBU) in the RO. The OBU may be linked to other on-board sensor units of the RO, such as a speedometer, a GPS system, a navigation application, etc. The OBU may be configured to receive the respective outputs of the on-board sensor units as inputs, wherein the sensor units can either send their respective outputs to the OBU periodically with a specified periodicity or they are solicited by the OBU, e.g. periodically or on-demand. The RON message may be generated by the OBU based on the information received from the sensor units, such that each RON message will contain the latest state information of the RO.

In an embodiment, the RON message may be encoded in Cooperative Awareness Messages (CAMs), in particular following the basic set of applications for vehicular communications as specified in ETSI-Intelligent Transport Systems-EN 302 637-2-V1.4.1, or in Decentralized Environmental Notification Messages (DENMs), in particular following the specifications of the DEN basic service as specified in ETSI-Intelligent Transport Systems-EN 302 637-3-V1.3.0.

Figure 2:
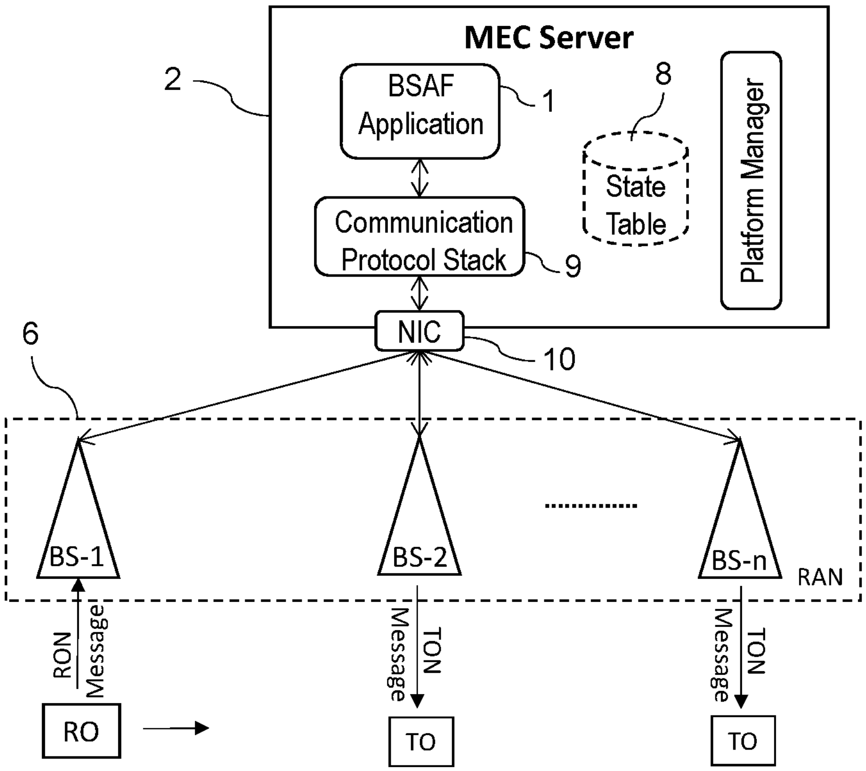
FIG. 2 is a schematic diagram illustrating a beyond-visual-audible-range system for estimated time of arrival, ETA, information derivation and dissemination according to embodiments of the present invention.

A high level overview of a system according to embodiments of the invention is shown in FIG. 2. According to these embodiments, the BSAF application 1 is realized as a container based MEC (Multi-Access Computing) application hosted on a physical or virtual compute infrastructure, such as a MEC server 2. It should be noted that the RO must be aware of the identity (address) of the compute server hosting the BSAF application 1. There are various options to enable the RO to discover the identity of such a server and connect to it. According to embodiments of the invention, the RO may be configured to broadcast the RON messages towards the Radio Access Network, RAN 6, i.e. to the RAN base station, BS, the RO is currently associated with. The RON message may then be relayed to the MEC server 2 to which the respective RAN node, i.e. the BS, is associated with. That is, the RAN 6 is responsible for routing the RON message to the correct MEC server 2 instance.

The MEC server 2 may be configured, upon identifying the received broadcast message as a RON message, to forward the RON message to the BSAF application instance 1, or instantiate a BSAF application instance 1 if not already available as a virtual application function instance. The BSAF application instance 1 is then responsible for processing the information in the RON message to calculate the ETA and/or other information related to the RO.

According to embodiments of the invention, the information derived/computed from the relevant parameters in the RON message may then be encoded as a notification message towards the TOs, which is referred to as TO Notification (TON) message. As an embodiment, this message can be realized as a DENM message and then relayed towards the RAN 6 BSs (e.g., eNBs), which then broadcasts the TON message within its respective coverage area.

With respect to the distribution of the TON messages to the TOs, basically, the BSAF 1 could keep track of the ID of all TOs on the route path, calculate ETA for each respective TO and then unicast to them. However, as already mentioned above, this comes along with a rather high system complexity. Therefore, in order to reduce the complexity, embodiments of the invention address this issue by configuring the BSAF 1 to calculate the ETA for specific logical sectors on the route path and then broadcast the ETA within that sector that will be received by all vehicles that are present in that sector at the time of broadcast.

According to an embodiment of the invention, such sectors on a route path may be defined by the coverage area of a mobile BS such as eNB. Thus, the coverage area of an eNB located along the route path can be considered as one sector, as exemplary shown in FIG. 1. Hence, there can be as many sectors as there are eNBs between the RO and the event location (i.e., destination). The BSAF 1, based on the current location information of RO and the destination in the RON message, may be configured to select the eNB(s) that are on the route path. The BSAF application 1 may then be provisioned supplementary information related to the eNBs such as, but not limited to, the coverage area and the geo-location of the selected eNBs. Based on this information the BSAF 1 will calculate the ETA of the RO with reference to each sector based on any known method. For example, the ETA of the RO may be calculated from the RO speed and its distance from the respective sectors based on for example the speed-distance formula:

$$ETA_n = S_n / V \quad (1)$$

where $ETA_n$=ETA with respect to sector n(i.e., $eNB_n$), where n=1,2,3, . . .

$S_n$=relative distance of the EmV from the $eNB_n$

V=(average)speed of the EmV.

Thus at every periodic iteration, the BSAF 1 will receive the RON notification message from the RO with updated values (see Table 1) reflecting the RO's current state, and based on equation 1 will calculate the ETA for all n-sectors, as exemplary shown in FIG. 1 for two sectors (i.e., sector 1 and sector 2) and three TOs (i.e., vehicles V1, V2 and V3).

However, an issue with characterizing a cellular BS as a sector is that owing to large coverage area of a cellular BS (which is approx. 20 km and more), computing a single ETA value per sector will result in a rather inaccurate ETA notification to TOs due to their respective position within the sector with reference to the EmV. That is, with reference to the EmV, the TOs (i.e., Vehicles) that are at the farther edge of the sector (i.e., cell boundary) will have a higher actual ETA than those that are behind it and relatively close to the EmV. This is clear from FIG. 1, where ETA2<ETA3 because V3 is farther away from EmV as compared to V2.

In embodiments of the invention, a sector may be further divided into sub-sectors, in order to increase the accuracy of ETA. For instance, the number of sub-sectors may be dependent on one or more external factors, for example, traffic situation, traffic density and/or the like. The sub-sectors may be characterized by geo-coordinates, and such sub-sectors are referred to in the present disclosure as geo-sectors (GS).

However, in contrast to state of art geofencing methods, where geofences are statically deployed and/or expand/contract at a specific location around a particular center point (as described, for instance, in U.S. Pat. No. 8,941,489 B2, according to embodiments, the present invention provides a method where geo-sectors (GS) are deployed on-demand. In particular, the number of GSs and their respective shape and size (i.e., coverage area) may be dynamically adjusted based on external factors, such as actual or predicted traffic density, shape of the road and/or other conditions. In some embodiments, the GSs may be predictively determined and deployed based on machine-learning, ML, technique as well. Accordingly, by learning and continuously improving the process of GSs determination, it is possible to create dynamic geo-sectors dynamically for fine-grained ETA calculations of ROs (e.g. EmVs) and maneuver recommendations for TOs.

Hereinafter, for the purpose of description/explanation and without implying any limitations, the shape of a GS is assumed to be a square, as shown exemplarily in FIG. 3. However, the GS can be of any shape from a polygon to a circle to even elliptical, etc. The shape can also be adopted to characterize the shape of the coverage area.

Figure 3:
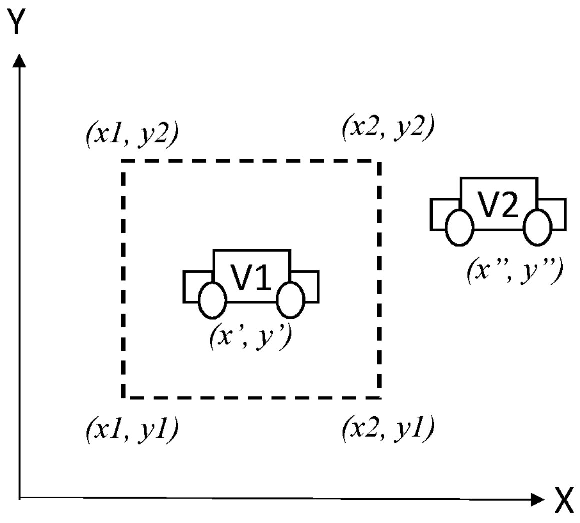
FIG. 3 is a diagram illustrating the concept of a Geo sector, GS, as employed in systems and methods in accordance with embodiments of the invention.

More specifically, FIG. 3 shows a conceptual depiction of a GS that is configured as a dashed-square, where the four (x,y) coordinates of the dashed square represent the geographical coordinates of the GS. An object, e.g., a vehicle is said to remain within the bounds of the GS as long as its geo-coordinates remain within the coordinates of the GS, else it is considered outside the GS. For example, in FIG. 3, the vehicle denoted V1 is considered within the GS because its geo-coordinates (x',y') are within the prescribed GS boundaries. In contrast to V1, vehicle V2 is outside the GS because its coordinates (x",y") are outside the coordinates of the prescribed GS.

According to embodiments of the present invention, the BSAF function 1 gets periodic notifications about the state of RO(s) encoded in the RON messages, as explained above in connection with Table 1 providing a non-exhaustive list of RO related state information as an example. The first RON message of a particular RO may also serve as a trigger to activate the BSAF application function.

Figure 4:
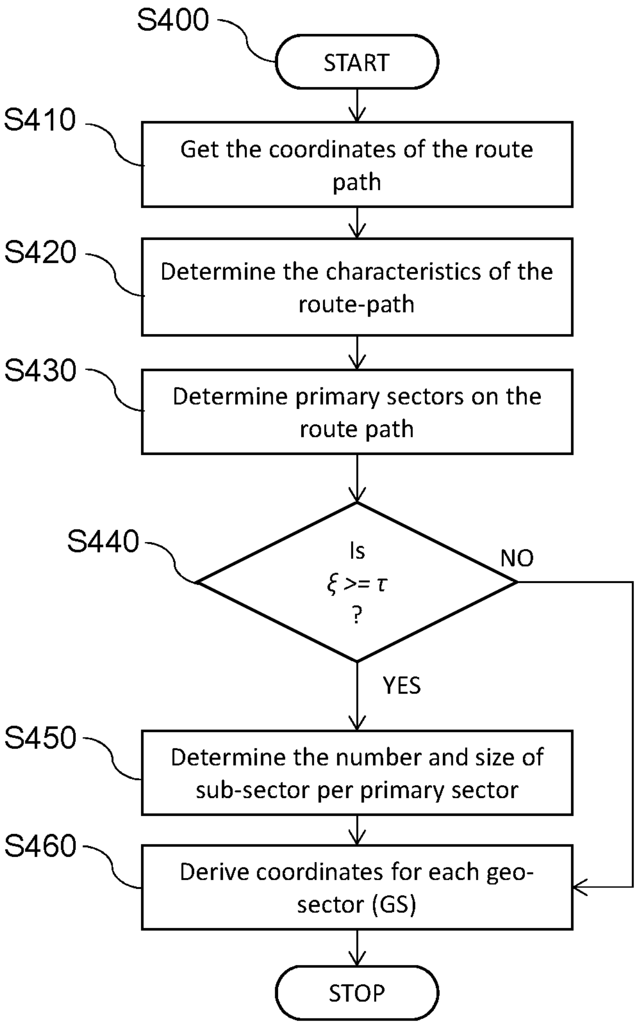
FIG. 4 is a flow diagram illustrating a process of a BSAF application determining geo-sectors in accordance with embodiments of the invention.

FIG. 4 shows an embodiment of a process of the BSAF application 1 determining the geo-sectors. The process starts at S400, upon the BSAF application 1 receiving a respective trigger message. According to an embodiment, this trigger message may be the first RON message sent by a particular RO, e.g. a EmV.

As shown at S410, the BSAF application 1 first gets the coordinates of the route path of the respective RO that is encoded in the RON message.

Next, as shown at S420, based on local maps, or from an external map application, the BSAF application function determines the characteristics of the route-path such as, for example, type of road (highway, city road, residential zone, one way, two-way), total lanes, speed limits, etc.

At S430, the BSAF application function 1 then logically determines primary sectors on the route-path, i.e. between the current location of the RO and the possibly affected TOs. As described above, the primary sectors can be characterized by the coverage area of a cellular base station, BS, covering the route-path. In this case, the BSAF application 1 requires BS characteristics including, but not limited to, BS IDs, BS geo-locations, BS coverage areas/ranges, etc. Such information may be accessed and retrieved from an external source, e.g., from cellular service providers.

Figure 5:
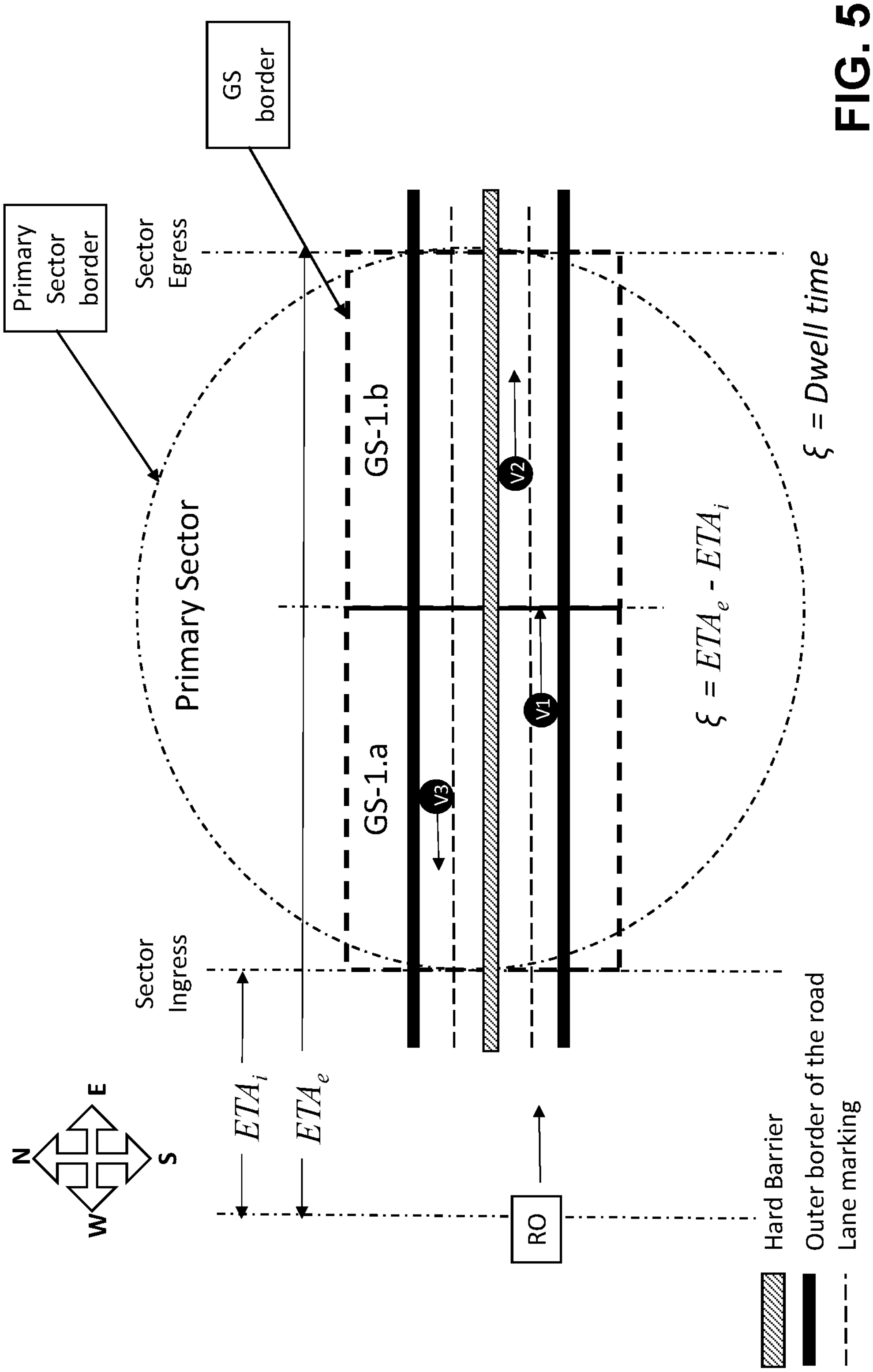
FIG. 5 is a schematic diagram illustrating a resolution factor concept applied in a system in accordance with embodiments of the invention.

At S440, the BSAF application 1 determines whether there is a need to divide the respective primary sector(s) generated at S430 into sub-sectors. According to embodiments of the invention, this decision may be based on a resolution factor (Δr) with respect to the RO, wherein the resolution factor (Δr) determines the temporal resolution of the RO's ETA. For example, a value of Δr=300 may imply the ETA difference ξ between the ingress and egress points of a primary sector with reference to RO as 5 minutes (300 seconds), where ξ is the dwell time of the RO in a sector. This is illustrated in FIG. 5. If $\xi >= \tau$, where τ is some pre-defined threshold, the method will proceed to step S450, else it will directly jump to step S460.

As shown at S450, depending on the value of ξ the BSAF 1 may determine the number of sub-sectors that the primary sector should be divided into. During the initial sub-sectorization, it may be provided that the sizes of the respective sub-sectors are equal, that is, the primary sector is equally divided between the sub-sectors.

It should be noted that the BSAF application function 1 may calculate the ETA towards sector ingress ($ETA_i$) and sector egress ($ETA_e$) based on the RO's average speed and current location assuming a clear path. However, for a more accurate determination of the number of sub-sectors, the BSAF application function 1 may calculate $ETA_e$ based on some historical traffic data in that particular location at this particular time. The BSAF application function 1 may acquire such data from an external database within the Intelligent Transportation System (ITS). In case the BSAF application function is provided raw historical data, then it can use advanced statistical techniques or ML based method to predict both $ETA_i$ and $ETA_e$.

Next, as shown at S460, the BSAF application function 1 derives coordinates of the GS characterizing the primary sector. If the primary sector has been further sectored in step S450, then the BSAF application function 1 derives GS coordinates for each respective sub-sector. With respect to the example shown in FIG. 5, the primary sector is divided into two GSs, namely GS-1a and GS-1b. The GS bounding each sub-sector is characterized as explained above in connection with FIG. 3. For the sake of explanation, FIG. 5 shows a primary sector divided into two equal GSs. However, as will be explained in greater detail below, the size of GSs within a sector may not be the same. That is, a primary sector can be subdivided into multiple GSs where the size of each GS may be different from one another. In any case, the geo-sectoring is done on the region between the RO and DO.

Figure 6:
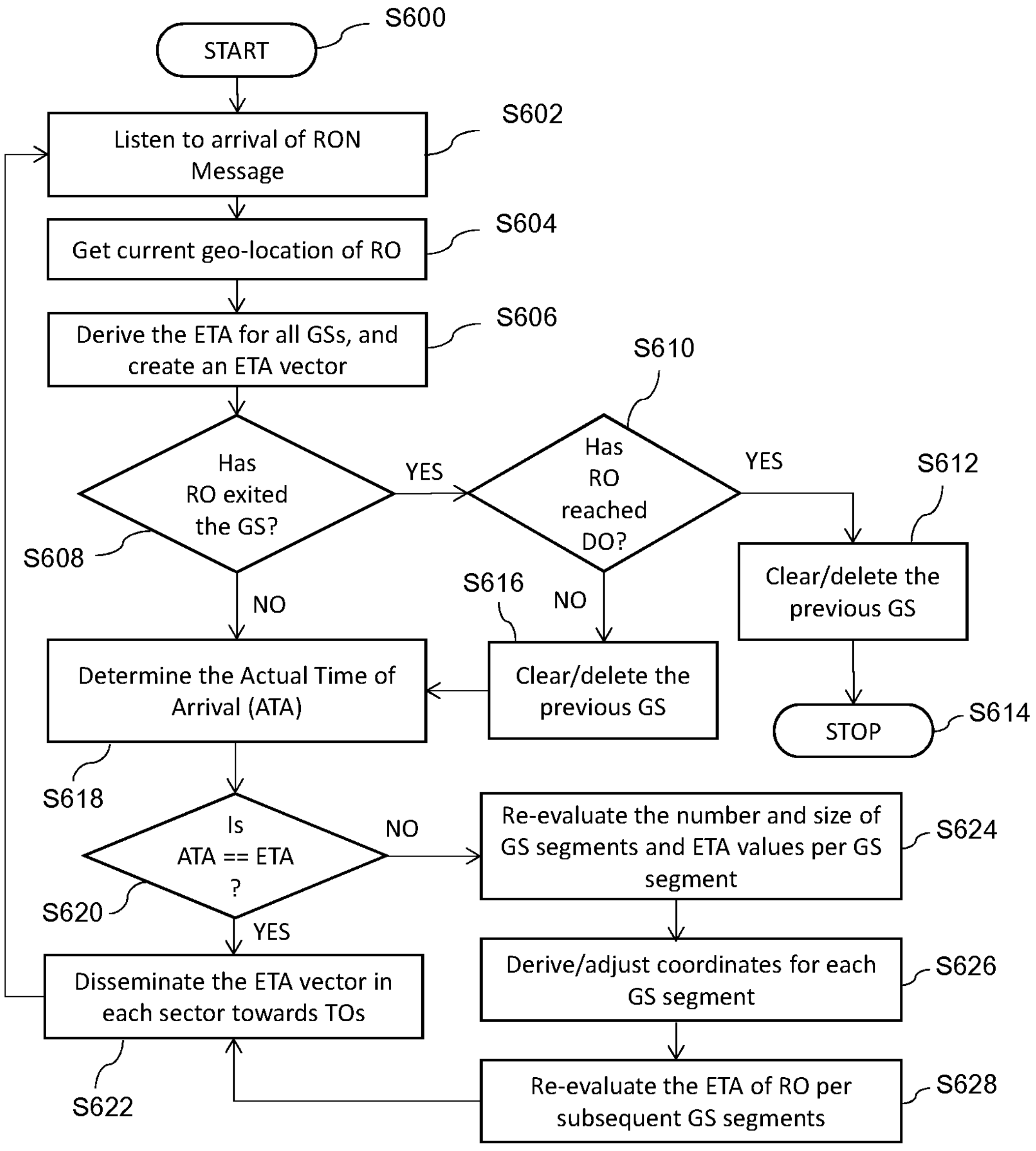
FIG. 6 is a flow diagram illustrating a BSAF application logic for processing RON messages in accordance with embodiments of the invention.

According to embodiments of the invention, once the route-path between the RO and the DO has been sectorized and the GSs have been established, the BSAF application 1 may process the information in the RON message to determine the ETA of the RO for each respective GS. FIG. 6 provides an exemplary logic of the BSAF application when processing RON message for a (re-)calculation and/or (re-) evaluation of the ETA and GS and other related information.

According to the illustrated embodiment, the BSAF application 1, after starting the process at S600, is listening on a pre-defined port to any received RON message, as shown at S602.

Once received, the BSAF application 1 extracts the current geo-location from the RON message (which, in accordance with the indications in Table 1 above, may be encoded in the RON message) and determines the position (i.e., geo location) of the RO from which the RON message is received from. This step is illustrated at S604.

Next, as shown at S606, based on the current geo-position and the current/average speed information of the RO as received in the RON message and the information on the coordinates of the GSs (herein sometimes referred to as GS map 7), the BSAF application 1 is able to compute/predict the $ETA_i$ of the RO with respect to the ingress of each GS. There are known methods to determine the ETA that will be obvious to anyone skilled in the art such that a detailed description can be omitted here.

According to embodiments, the calculation of ETA for a first GS preceding the RO takes into account the current GPS coordinates and the current/average speed of the RO. The $ETA_i$ for subsequent GSs may also take into account the ETA of the previous GS as well as its size in distance, in addition to the RO's current geo-location and current/average speed. As an embodiment, the $ETA_i$ calculation can also take into account the predicted traffic situation in the different GSs based on past traffic information, current traffic information, distance of the route, hour of the day, and/or other relevant factors.

According to an embodiment of the invention, after the $ETA_i$ values for the respective GSs have been calculated, the computed $ETA_i$ values are encoded as a vector. In the present disclosure such vector is referred to as an ETA vector.

Figures 7, 8:
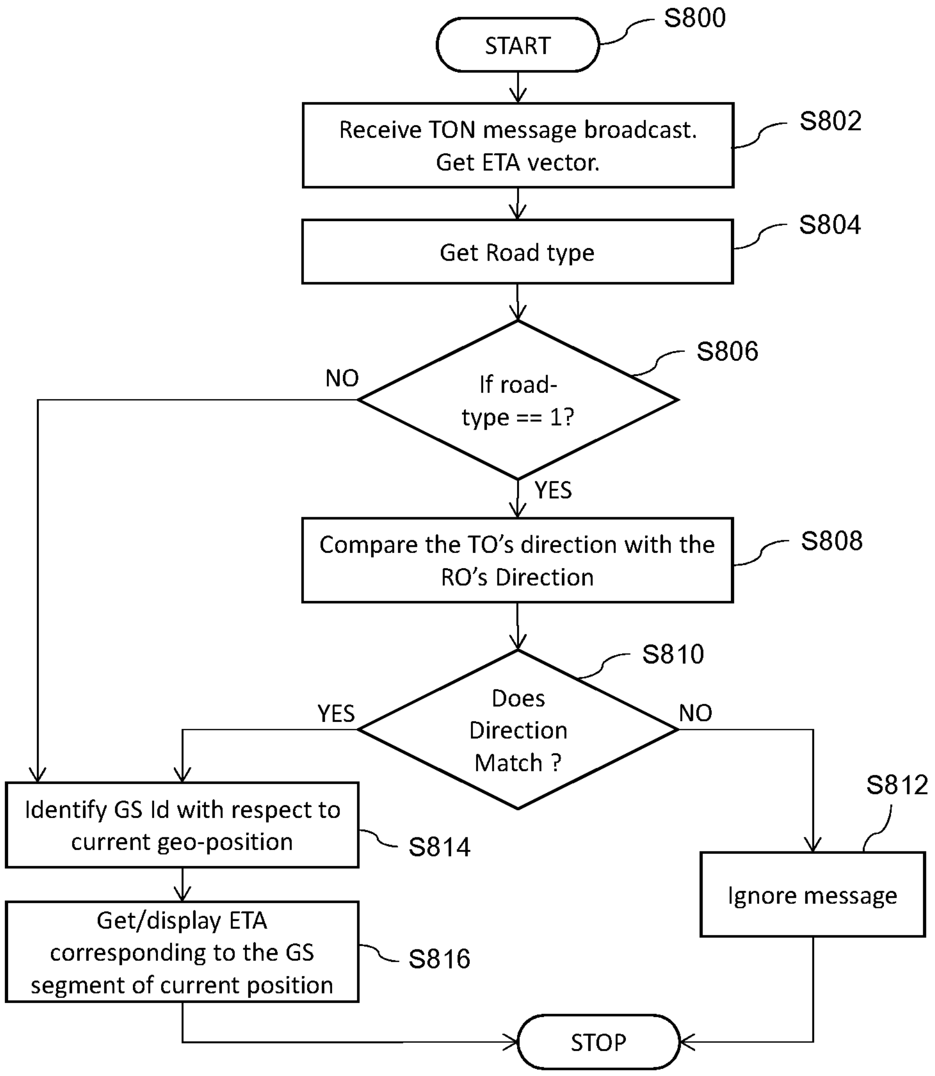
FIG. 7 is a schematic view illustrating an example of an ETA vector in accordance with embodiments of the invention.
FIG. 8 is a flow diagram illustrating a process at the TOs for processing TON messages in accordance with embodiments of the invention.

FIG. 7 illustrates an exemplary information model of an ETA vector in accordance with an embodiment of the invention. As shown, the information model of an ETA vector may be realized as a multi-key map, comprising two keys (Key 1 and Key 2) and a value. In this embodiment, Key 1 (RO Direction) represents the direction of travel of the RO (e.g., EmV). It can be represented by an enum data type. Key 2(GS Id) identifies the GS. It can be represented by a set of coordinates characterizing the boundaries of the GS. The Key 2 can be a List-type data structure considering the BSAF application 1 computes information for a chain of GSs between the RO and TO. Value (ETA) is the ETA value of the RO computed for the respective GS Id. The other values GS Type and Notifications will be described with reference to FIG. 11.

As shown at S608 in FIG. 6, the BSAF application 1 uses the knowledge about the current geo-position of the RO and the GS map 7 to determine whether the RO has moved to the next GS in the GS chain or not. In this context it should be noted that one sector's egress is the preceding sector's ingress since the geo-sectors are in a chain configuration.

If the BSAF application 1 determines in step S608 that the RO has moved out of a particular GS, then the BSAF application determines whether the RO has already reached the DO or not, as shown at S610. If it has, the BSAF application 1 will clear/delete the respective GS from its GS map 7, as shown at S612, and revert to a standby state at S614. In case the RO has not reached the DO, it can be implied that the RO has entered the next GS in the chain. The BSAF application 1 will therefore clear/delete the previous GS entry from the GS map, as shown at S616 and then derive an actual time of arrival (ATA) of the RO from the time-stamp information in the received RON message, as shown at S618.

Next, as shown at S620, the BSAF application 1 compares the ATA with the computed ETA for the current GS. In case both values are the same, or the difference is within some predefined limit, the BSAF application disseminates the ETA vectors via the mobile network infrastructure in all GSs in the GS-chain to be received by the TOs, as shown at S622.

There are different options of disseminating such an ETA vector towards the TOs. In one embodiment, the ETA vector is embedded in a TON message, which is encoded in a CAM or DENM message to be disseminated as a notification message towards TOs. The TON message may be broadcasted by each BS within its coverage area to be received by all TOs (e.g., vehicles) that are within the respective primary sector. Once disseminated the BSAF application will return to process step S602 where it will listen to the next RON message from the RO.

Otherwise, i.e., in case at S620 the ATA and ETA are determined to be not equal, the BSAF application reevaluates the number and size of the GSs of the GS chain (i.e. the GS map 7) and the ETA values per re-evaluated GS, as shown at S624.

With respect to the GS dimensions and the GS map 7, as shown at S626, it may be provided that the BSAF application 1 readjusts the sizes of different GS segments in the GS-chain, making some bigger while others smaller by certain proportions, and/or add new GS segments in the GS-chain. As mentioned before, the coverage size of different GS segments in a GS-chain is not necessarily the same and they can vary depending on various factors, such as congestion, dwell time of the RO in a particular GS, etc.

With respect to the ETA values, as shown at S628, the ETA for the RO is re-evaluated per each subsequent GS. In this context, it is important to note that a change in the ETA value for one GS, and/or a change in the GS map 7, will influence the values of all $ETA_{iS}$ computed for subsequent GS segments. This is because the ETA of one GS is computed by taking into account the ETA value computed for the previous GS in the GS-chain.

After the re-evaluation, the ETA vector is updated and disseminated, as described above in connection with step S622.

The process steps S618-S628 will be repeated each time a RON message is received even if the RO is within the same GS segment. In process step S622, when the TON message carrying the ETA vector is broadcasted or anycasted within its primary sector, all the TOs receiving the TON message will process the message as per the exemplary logic shown in FIG. 8.

According to the illustrated embodiment, the TO starts processing at S800 by receiving a broadcasted TON message and extracting the ETA vector from the received TON message, as shown at S802.

Next, as shown at S804, the TO determines the type of road/path it is on. For the sake of example, two different types of roads (road type 1 and road type 2) are assumed: Roads of a road type 1 have a hard physical barrier dividing the road for traffic in two directions, whereas roads of a road type 2 have a soft/logical divider (a white painted strip of unbroken line) that divides the road for the two directions of traffic. Therefore, for road type 2, the ETA values are relevant for vehicles in both directions as the RO can move across the soft/logical divider. For road type 2, the ETA values are relevant only for those TOs moving in the direction of the RO as the RO is not able to move across to the other side of the road due to hard barrier.

Therefore, if the TO determines at S806 that the road type is 1, then based on the navigation system data, the TO compares its current direction of motion with that of the RO direction specified in the ETA vector, as shown at S808. It should be noted that the ETA vector may be composed in accordance with the embodiment shown in FIG. 7.

If the TO determines at S810 that the direction does not match, i.e., the TO is moving in a direction opposite to the RO, implying that the TO is on the other side of the road where the road is divided by a hard barrier, then in that case the TO ignores the TON message, as shown at S812.

On the other hand, if the TO determines at S810 that the RO direction matches with the TO's own direction of travel, or if the TO, at S806, identifies the road as type 2, then the TO identifies the GS Id in which it is presently moving in, as shown at S814. This may be accomplished by the TO identifying its current position with respect to the most relevant GS id provided in the ETA vector.

Once the TO has found/identified the GS id, within which domain its current position is located, it gets the ETA value corresponding to the matching GS id from the ETA vector and notifies the driver of the ETA, for instance visually and/or via audio message, as shown at S816.

As described above, embodiments of the present invention relate to a method for an on-demand creation of a GS-chain between the RO and the DO, and its serial deletion with reference to the movement of the RO. According to a further embodiment, the individual GSs in the GS-chain may be configured in an elastic way, as will be described hereinafter in greater detail with reference to FIG. 9.

Figure 9:
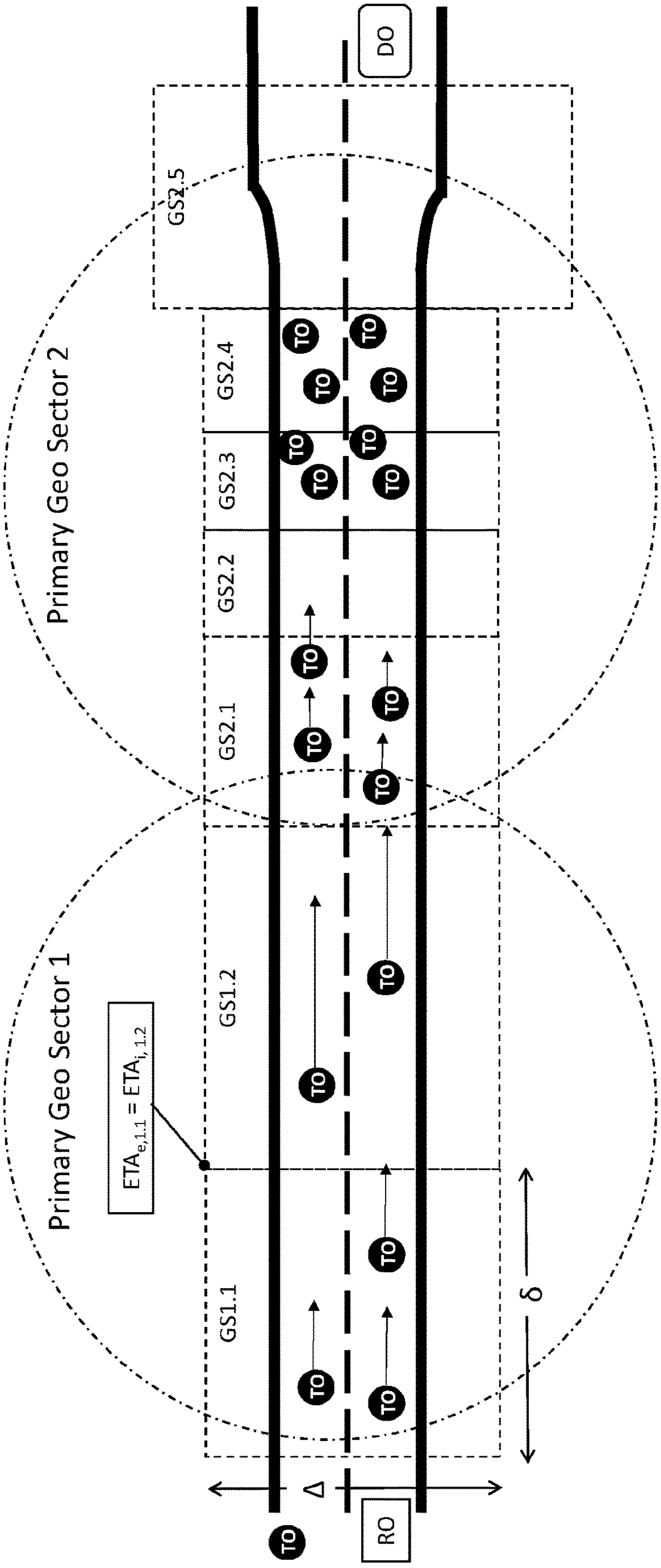
FIG. 9 is a schematic diagram illustrating a scenario with elastic individual GSs in a GS chain in accordance with embodiments of the invention.

FIG. 9 shows a GS-chain with a total of 7 GS segments deployed across two primary geo sectors namely Primary Geo Sector 1 and Primary Geo Sector 2. GS1.1 and GS1.2 are deployed mainly within the Primary Geo Sector 1, while GS2.1-2.5 are deployed across Primary Geo Sector 2. It should be noted that the GS-chain is instantiated between the RO and the DO, whereas the DO lies just outside the last GS2.5. There are many TOs distributed across the GS-chain and the direction and size of the arrow indicate the TOs direction of movement and speed. The arrow size is proportional to the speed of the TO.

The size of a GS is characterized by the parameters ($\delta$,$\Delta$) indicating the length and the width of an individual GS segment. It should be noted that the GS can be of any shape, but for the sake of simplicity and clarity of description, it is assumed here that a GS is characterized by a square shape. As noted in FIG. 9, the sizes of the respective GS segments are not the same and they differ from one another. According to an embodiment of the invention, the length $\delta$ of a GS may depend on the difference between the ingress and egress ETA, where it is dictated by some function $f$ that can be linear, non-linear (e.g., exponential, etc.). This can be represented as follows:

$$\delta_{max} \geq \delta \geq \delta_{min}$$

$$\xi = ETAe - ETAi$$

$$\delta = \delta_{max} \text{ when } \xi < |\tau|$$

$$\delta = f(\xi) \text{when } \xi \geq \tau$$

$$\delta = \delta_{min} \text{ when } \xi \geq |\tau'|$$

where $\tau$ and $\tau'$ are configurable ETA thresholds.

Figure 10:
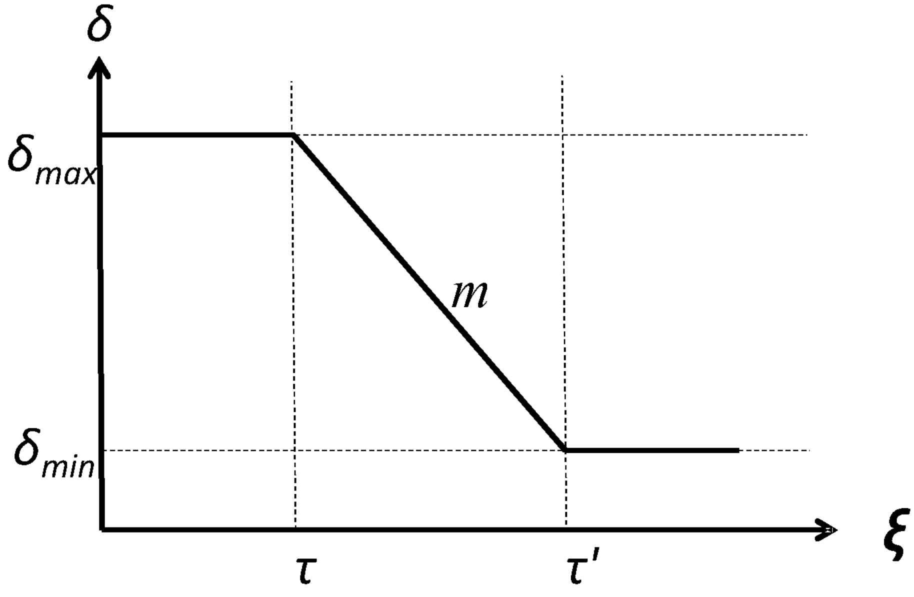
FIG. 10 is a diagram illustrating a function for elastic variation of a GS-zone in accordance with embodiments of the invention.

FIG. 10 illustrates the elasticity aspect of the individual GSs in the GS-chain in accordance with an embodiment of the invention. More specifically, FIG. 10 shows a diagram according to which the variation of the length $\delta$ of a GS is dictated based on a linear function between the ETA thresholds $\tau$ and $\tau'$. Particular to this example, the slope m can be regarded as a "elasticity stiffness" factor that determines how quickly or sluggishly the system varies the size of an individual GS sector based on environmental factors prevalent in the particular GS-zone. It should be noted that the system may use the same function for varying the size of one or all GS-zones within a GS-chain, or it may use different functions for different GS-zones in a GS chain.

As it is required to maintain a contiguous series of GS-zones in the GS-chain, therefore any shrinking of a particular GS-zone may result in a creation of a new GS-zone to cover the gap produced due to the shrinking of a specific GS-zone. For instance, considering the scenario shown in FIG. 10, it is possible that the GS2.3 was realized to cover a gap between GS2.2 and GS2.4 that appeared due to a shrinking of GS2.4.

As indicated above, the size of a GS-zone may be dictated by environmental factors prevalent in a GS-zone that will cause the length δ to either shrink or expand within specific maximum and minimum limits $\delta_{max}$ and $\delta_{min}$. According to embodiments, one of the factors could be, for example, the traffic congestion in a specific GS-zone and/or adjacent zones that may cause ξ to increase beyond a specific threshold τ. This is done to enhance the accuracy of the ETA such that the Actual Time of Arrival (ATA) of the RO experienced by all TOs within the same GS-zone should approximately be equal to the value of the ETA calculated for that GS. Therefore the length δ of GS will be smaller in case of higher traffic which will slow down the speed of the RO, and it will be larger in case of light traffic in which case the RO will move with minimum hindrance and at a higher speed.

The system or, more precisely, the BSAF application function 1, may get information on traffic conditions either from an external traffic management system, and/or it can infer such traffic conditions based on information received from the radio network infrastructure. Such information from the RAN 6 may include, for instance, the number of attached UEs, indicating the number of TOs, and/or the handover frequency in a particular primary sector to infer a level of congestion within a primary sector. According to a further embodiment, a more accurate inference about traffic conditions at the granularity of the GS-zone can be made if the TOs are explicitly sending periodic notification messages such as CAM or DENM messages indicating their geo-location as a minimum information.

According to embodiments of the invention, the information about TOs based on radio network infrastructure may be inferred by leveraging the Radio Network Information System (RNIS) service that is part of the MEC service.

Figure 11:
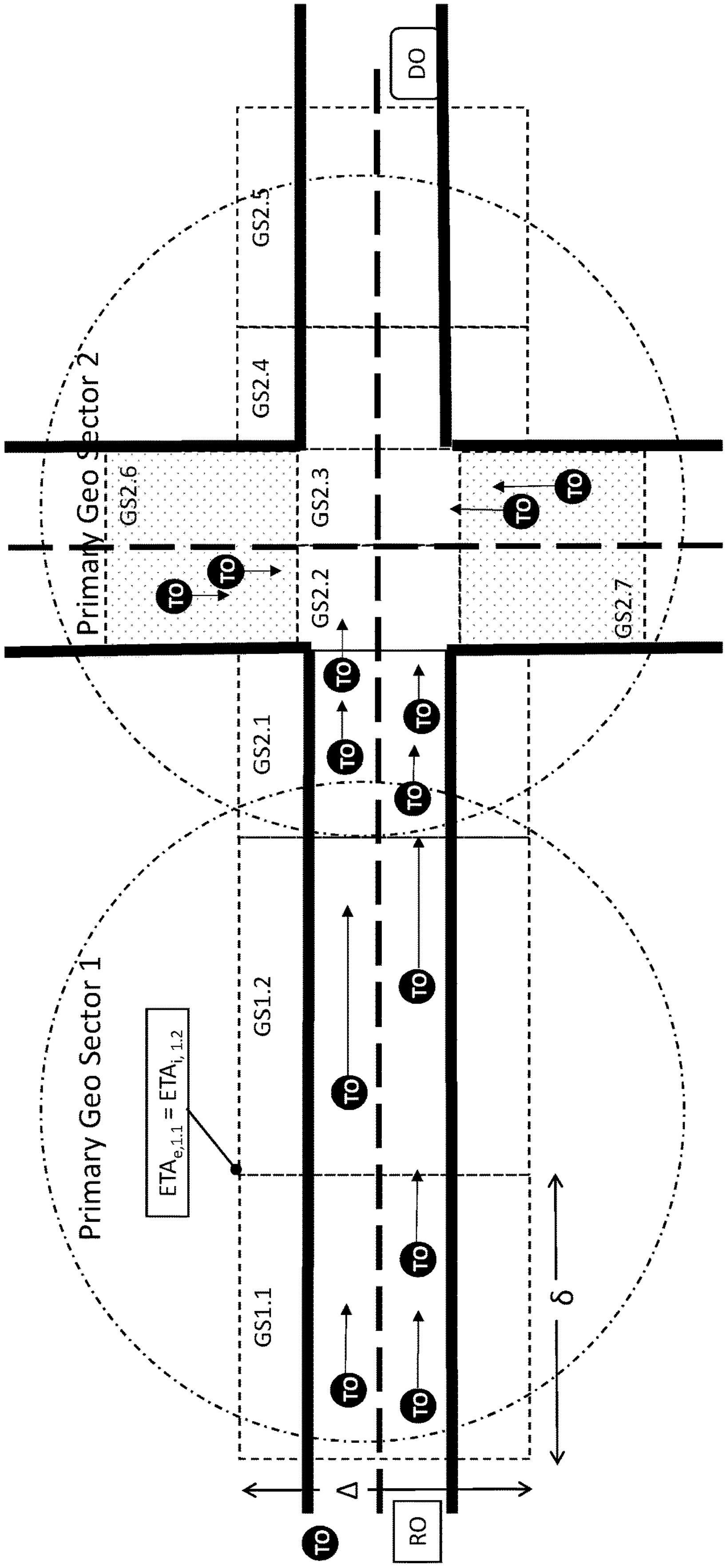
FIG. 11 is a schematic diagram illustrating a scenario with warning zones at intersections of the RO's route in accordance with embodiments of the invention.

FIG. 11 illustrates another embodiment of the invention, according to which warning notifications are sent to those TOs that are not on the route path of the RO but are approaching an intersection of the route path. Such TOs are not required to be provided the ETA but are required to be warned to not cross the intersection until a certain time. For instance, with reference to the scenario of FIG. 11, TOs in GS2.6 and GS2.7 are intersecting the route path of the RO. Such TOs are not required to maneuver to create a clear corridor, but they must not cross the route path of the RO at the intersection when the RO is imminent to cross. For such TOs, the BSAF application function may generate special notifications, which in addition to the ETA of RO includes adequate warning notification messages, such as "DO NOT CROSS", "CLEAR TO CROSS" etc.

To provision such messages, the BSAF application function 1 may be configured to differentiate between the types of GS. Referring back to FIG. 7, the GS type may be a parameter of the type enum. Based on this, different GS types can be denoted. For instance, the GS segments that are on the route-path of the RO can be denoted as "active notification GS", while GS segments that are not on the route-path, but can potentially disrupt the smooth passage of the RO, such as at intersection of the RO's route-path, can be denoted as "active warning GS".

For "active notification GS", it may be provided that ETA values along with relevant notification messages are transmitted. According to embodiments, the notification messages (as shown in FIG. 7) may include messages such as "clear way", "reduce speed", "stop to the side", "increase distance from front TO", etc. On the other hand, notification messages for TOs in the "active warning GS" may include messages such as "stop at the intersection", "do not cross", etc. The ETA vector message (as shown in FIG. 7) can thus encode many types of GS segment types and a variety of notification messages relevant to the particular GS type.

According to embodiments of the invention, to ensure against premature traffic congestion at the intersections, the warning notifications may be generated only when the ETA becomes less than a specified threshold. For example, for a threshold value of 2 minutes, if the ETA value becomes less than 2 minutes, only then warning messages are broadcasted to TOs in the "active warning GS".

Figure 12:
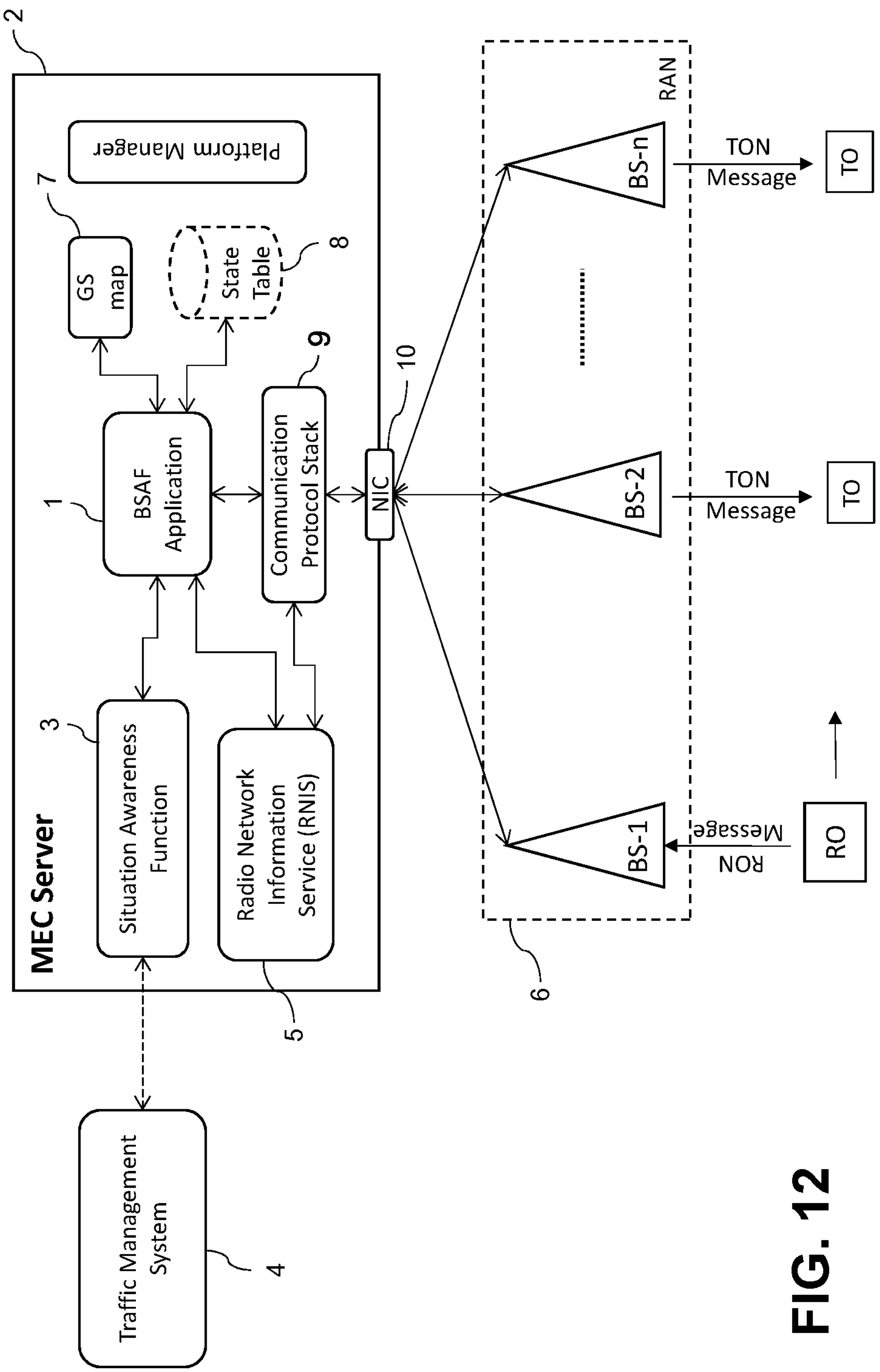
FIG. 12 is a schematic diagram illustrating a beyond-visual-audible-range system for estimated time of arrival, ETA, information derivation and dissemination according to embodiments of the present invention.

FIG. 12 shows schematically a system for enabling accurate RO ETA information and dissemination according to an embodiment of the present invention. The system comprises a BSAF application function 1, which in the embodiment depicted in FIG. 12 is deployed in an edge computing device, such as a MEC server 2. The MEC server 2 is interconnected with the mobile network core/RAN infrastructure 6 such as 3G/4G/5G or beyond. The MEC server 2 can also optionally be connected to an external Traffic Management System 4, via the situation awareness function, to enable it to get updated information about road/traffic situation.

The information obtained is used by the BSAF application function 1 to compute/compose/manage the GS-chain between the RO and the DO. In addition, the information may be used for (re)computing the information specific to the GS-segments, such as RO's ETA towards TO, based on RO's current location and traffic/road conditions. The traffic/road information can also be inferred from the RNIS service that is receiving information from the RAN 6 of the mobile network communication infrastructure. The BSAF function 1 maintains the latest/updated state information in a state table 8, which can be either external or internal to the BSAF application. The BSAF application function 1 also manages and maintains the GS-chain map in a GS map 7. The BSAF application function 1 may be configured to compute the ETA information with respect to the information contained in the RON messages the BSAF application 1 receives periodically. The BSAF application function 1 is further configured to determine the GS type and to select notification messages appropriate for the GS type. An embodiment of a respective process logic has already been described above. The computed information will be disseminated in the sectors by broadcasting TON messages, which are communicated using the communication protocol stack in the MEC server 2 and transmitting them via the MEC's Network Interface Card, NIC, 10 towards the RAN 6. As an embodiment, the system components shown in FIG. 12 inside the MEC server can be realized as virtualized functions either in one or more Virtual Machines (VM) or in Containers. Other implementation strategies could be realized as well, as will be appreciated by those skilled in the art.

According to an embodiment, the accuracy of the received ETA of the RO towards TOs can be further enhanced when combined with leveraging the direct communication between the RO and the in-range TOs using V2V communication protocols such as for PC5 link. However, in such a scenario the TOs should have the capability to process the RON message to derive the ETA with respect to itself and the RO current location. The TOs can then further relay the received RON message to the in-range TOs at the front and so on. The drawback is that such successive relay will get cut off when the TOs get out of direct communication range thus interrupting/breaking the service.

In any case, the OBUs of the TOs, upon receiving RO specific information such as the ETA, may be configured to inform the drivers accordingly, in particular by displaying visually and/or audibly to the drivers the ETA value using the TO multimedia system. Such advance notification will allow the drivers enough time to calmly evaluate the strategy to take preemptive measure, such as maneuvering to create a clear corridor for the RO to pass through unhindered towards the DO. The ETA coupled with specific notification messages can serve to provide manouvre recommendations by the BSAF application 1 to the TOs, as described with reference to FIG. 11.

Up until now, the DO was assumed to be static, but the same mechanism described herein can be leveraged in case that also the DO is mobile. In such a case, the GS-chain may remain maintained between the RO and DO, shrinking, expanding and thus sliding along as the distance between the RO and the DO keeps on decreasing, increasing, till the RO catches up with the DO.

As mentioned above, the TOs may receive the entire ETA vector encoded in the broadcasted TON message, and extract only the ETA value corresponding to all the GS-segments, while rejecting/ignoring the other information. However, the ETA vector information can be leveraged by the TOs to create augmented information of the status of the route path ahead of it. For example, the TO can derive information from the ETA vector such as road/traffic conditions ahead that can be displayed on the TO's display, e.g. using colored indications. For instance, with respect to FIG. 9, the display in TOs in GS1.1 may indicate the route path under GS1.1 as green indicating no congestion, while yellow for GS2.1 indicating mild congestion, and for GS2.3 and GS2.4 as red indicating severe congestion. This will allow the TOs to derive and visualize beyond-horizon information, thereby enabling the TOs with enough time to make appropriate decisions to avoid such situations in the forward route path.

As another embodiment, the BSAF application 1 can also be hosted on individual TOs, where the mobile network infrastructure relays by broadcasting the DENM or CAM messages received from the RO to the TOs. Each TO can then evaluate the ETA of the RO with respect to its current position. However, the ETA value may not be accurate when calculated in the TO because the TOs are not aware of the environmental situation (e.g., traffic situation) between the RO and the DO.

As yet another embodiment, the BSAF application function 1 can be hosted in the RO itself, and the mobile network infrastructure is only used to relay and disseminate the ETA vectors calculated on board the RO towards respective GS zones. In such case, the ETA vector may be encoded in both the RON and the TON message.

As another use case, the output of the BSAF application 1 can also be provisioned to the Traffic Management System 4 to control the traffic lights to help provide an unhindered movement of the RO towards the DO in a safe manner.

To summarize, embodiments of the present invention relates to a method and a system that enable accurate and fine granular determination and beyond-visual-audible-range (BVAR) notification of the ETA of a RO along with maneuver recommendations relevant to the position of the TOs between the moving RO and the static/mobile DO, where the ETA is determined with reference to each geo sector (GS) segment linked in a contiguous GS chain, whereby the GS-segments in a GS-chain are dynamically managed in reaction to prevailing path situation. Embodiments of the invention may include one or more of the following features/aspects:

1. The dimension of individual geo-sector segment to change in an elastic fashion in reaction to specific events within the area between the RO and DO, where a specified function parameter will determine the stiffness of elasticity.
2. The automatic deletion of geosector segments that has been crossed by the RO in the direction of DO.
3. The automatic realization of new geosector segment in the GS chain when the DO is moving away from the RO.
4. The number of GS segments in a GS-chain to change in response to the elastic variation of the GS segment dimensions in the GS-chain.
5. Selective selection of notification by objects within the same GS-segment zone.
6. The accuracy of information further improved by leveraging direct communications between objects within communication range.
7. Enabling the TOs with back situation awareness and beyond-horizon situation awareness.
8. Differentiating between different types of GS segments and provisioning of maneuver recommendations and/or warning notifications relevant to the type of GS.

According to the same or other embodiments, the present invention also relates to a method for creating smart geo sectors to calculate accurately ETA for RO comprising any of the following steps:

1. The RO periodically sending RO notification messages containing RO related state information to the system (network infrastructure such as MEC and/or Core Network or any Operator Network).
2. The method/system and the RO receiving periodic information about the location of the DO
3. The method/system for computing the composition of the geo-sector segments linked contiguously in a GS-chain based on some historical data for initial realization of the GS-chain between the RO and the DO.
4. The method/system dynamically and elastically managing the GS-chain throughout the lifetime of the GS-chain until the RO reaches the DO.
5. The system/method disseminating information specific to GS-segment zones, whereby each TO in a respective GS-segment zone will either ignore or extract information relevant to the GS-segment it is presently in.
6. The accuracy of information can be further improved by leveraging on direct communications between RO and TOs within communication range.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of warning target objects (TOs) of an approaching reference object (RO), the method comprising:

receiving, by a back-situation awareness function (BSAF) application running on a remote server via one or more base stations of a radio access network (RAN), RO notification (RON) messages from the RO containing RO related state information, generating, by the BSAF application, a geo-sector (GS) area including a number of GS segments between a current location of the RO and a destination object (DO) specifying a destination location of the RO, calculating, by the BSAF application, for each of the GS segments of the GS area an expected time of arrival (ETA) of the RO at a respective one of the GS segments, and disseminating, from the remote server via the one or more base stations of the RAN as a beyond-visual-audible-range notification, for each respective GS segment, the respective calculated ETA to respective ones of the TOs located in the respective GS segment.

2. The method according to claim 1, wherein the GS area is a GS chain and further comprising:

generating, by the BSAF application, the GS chain between the RO and the DO on-demand, wherein the GS segments of the GS chain are serially deleted with reference to the movement of the RO towards the DO.

3. The method according to claim 2, wherein generating, by the BSAF application, the GS chain further includes adding new GS segments to the GS chain based on traffic congestion or a dwell time of the RO.

4. The method according to claim 1, wherein the number of GS segments of the GS area and their respective shapes and sizes are dynamically adjusted based on actual or predicted traffic conditions, state and/or shape of the road, and/or other external factors.

5. The method according to claim 1, further comprising:

calculating, by the BSAF application, ETA values for a GS segment of the GS area towards an ingress of the GS segment and towards an egress of the GS segment based on historical traffic data for a location of the GS segment acquired from an external database.

6. The method according to claim 1, wherein a size of a GS segment is changed according to a configurable function based on a difference between calculated ingress and egress ETA values by the RO for the GS segment exceeding a predefined threshold.

7. The method according to claim 6, wherein different functions are used for varying the size of different GS segments of the GS area.

8. The method according to claim 1, wherein the RON messages are generated by an on-board unit (OBU) of the RO based on the information received from sensor units of the RO, wherein the RON messages may be realized as Cooperative Awareness Messages (CAM) or as Decentralized Environmental Notification Messages (DENM).

9. The method according to claim 1, wherein a periodicity of the RON messages is dynamically adjusted with reference to a speed of the RO, wherein the higher the speed of the RO, the higher the transmission frequency of the RON messages.

10. The method according to claim 1, wherein the GS segment specific ETAs are encoded in TO notification (TON) messages that are realized as Decentralized Environmental Notification Messages (DENM) messages.

11. The method according to claim 1, wherein the calculated ETAs and the beyond-visual-audible-range notifications for different GS segments of the GS area are encoded as a vector implemented as a multi-key map including at least two keys, wherein a first one of the at least two keys represents a direction of travel of the RO and a second one of the at least two keys identifies the GS segments of the GS area.

12. The method according to claim 1, further comprising determining which of the TOs the beyond-visual-audible-range notification is applicable to by identifying a road type and whether the road type includes a hard physical barrier, and determining whether a current direction of motion of the TOs match a direction of travel of the RO.

13. The method according to claim 12, wherein processing the TON message includes updating a multimedia system of the TO to visually and/or audibly notify a driver associated with the TO of the calculated ETA, generating and presenting maneuver recommendations for the TO to generate a corridor for the RO, or generating augmented information about a status of a route path for the TO that uses color indications to denote different traffic congestion levels.

14. The method according to claim 1, wherein the vector is encoded in a TO notification (TON) message that is disseminated to the TOs located in the respective GS segment, and wherein each of the TOs determines, upon receiving the TON message, whether to process the TON message based on identifying that a road type of a road that the TO is on includes a hard physical barrier or a soft/logical divider.

15. The method according to claim 1, further comprising adjusting a size and/or shape of at least one of the GS segments based on traffic congestion or a dwell time of the RO.

16. The method according to claim 1, wherein calculating, by the BSAF application for each of the GS segments of the GS area, the ETA of the RO at the respective GS segment occurs prior to the RO arriving to the GS area.

17. A system for warning target objects (TOs) of an approaching reference object (RO), the system comprising a back-situation awareness function (BSAF) application implemented by a hardware processor and running on a remote server, the BSAF application configured to:

receive, via one or more base stations of a radio access network (RAN), RO notification (RON) messages from the RO containing RO related state information, generate a geo-sector (GS) area including a number GS segments between a current location of the RO and a destination object (DO) specifying a destination location of the RO, calculate for each of the GS segments of the GS area an expected time of arrival (ETA) of the RO at a respective one of the GS segments, and provide for dissemination, from the remote server via the one or more base stations of the RAN as a beyond-visual-audible-range notification, for each respective GS segment, the respective calculated ETA to respective ones of the TOs located in the respective GS segment.

18. The system according to claim 17, wherein the BSAF application is implemented as a container or a virtual machine-based Multi-Access-Edge-Computing (MEC) application hosted on an MEC server.

19. The system according to claim 18, wherein the MEC server comprises a situation awareness function connected to an external traffic information and management system that is configured to provide the BSAF application updated information about road and/or traffic conditions.

20. The system according to claim 18, wherein the MEC server comprises a Radio Network Information System (RNIS) service that is configured to receive updated information about road and/or traffic conditions from the RAN of a mobile network communication infrastructure and to provide the updated information to the BSAF application.

* * * * *